US012329070B2

United States Patent
Casadei et al.

(10) Patent No.: US 12,329,070 B2
(45) Date of Patent: Jun. 17, 2025

(54) ROUND BALER

(71) Applicant: KVERNELAND GROUP RAVENNA S.R.L., Russi (IT)

(72) Inventors: Valerio Casadei, Cesena (IT); Cosimo Frascella, Lugo (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 329 days.

(21) Appl. No.: 17/611,904

(22) PCT Filed: Jan. 20, 2021

(86) PCT No.: PCT/IB2021/050394
§ 371 (c)(1),
(2) Date: Nov. 16, 2021

(87) PCT Pub. No.: WO2021/148946
PCT Pub. Date: Jul. 29, 2021

(65) Prior Publication Data
US 2022/0346324 A1  Nov. 3, 2022

(30) Foreign Application Priority Data
Jan. 20, 2020 (IT) .................. 102020000000928

(51) Int. Cl.
*A01D 75/18* (2006.01)
*A01F 15/07* (2006.01)
*A01F 15/08* (2006.01)

(52) U.S. Cl.
CPC ...... *A01F 15/0833* (2013.01); *A01F 15/0883* (2013.01)

(58) Field of Classification Search
CPC .............. A01F 15/0833; A01F 15/0883; A01F 15/0825; A01F 15/0841; A01F 15/085;
(Continued)

(56) References Cited

U.S. PATENT DOCUMENTS

| 6,370,852 B1 | 4/2002 | Ohlemeyer et al. |
| 2014/0029879 A1* | 1/2014 | Brehm .................. G01L 3/102 384/446 |

(Continued)

FOREIGN PATENT DOCUMENTS

| CN | 204389493 U | 6/2015 |
| CN | 209480999 U | 10/2019 |

(Continued)

OTHER PUBLICATIONS

PCT International Search Report and Written Opinion from PCT International Application No. PCT/IB2021/050394, International Filing Date Jan. 20, 2021 (12 pgs).

*Primary Examiner* — Adam J Behrens
*Assistant Examiner* — Robert E Pezzuto
(74) *Attorney, Agent, or Firm* — Wentsler LLC (57) ABSTRACT

A round baler connectable to a tractor for providing round bales comprises: a baling chamber, configured for receiving crops and forming a bale; a frame, at least partially delimiting the baling chamber; a drive shaft, connectable to the tractor and configured to receive mechanical power from the tractor; a transmission system, for receiving mechanical power from the drive shaft and for imparting a rotating movement to the crops contained in the baling chamber, the transmission system including a drive roller connected to the frame, a chain assembly connected to the drive roller, and an oil circuit, containing lubricant oil for the chain assembly; a control unit, a sensor associated with the transmission system.

19 Claims, 8 Drawing Sheets

(58) Field of Classification Search
CPC ........ A01F 15/08; A01F 15/101; A01F 15/10;
A01F 15/106
See application file for complete search history.

(56) References Cited

U.S. PATENT DOCUMENTS

| | | | |
|---|---|---|---|
| 2015/0373919 A1* | 12/2015 | Verhaeghe | A01F 15/10 100/188 R |
| 2015/0379785 A1 | 12/2015 | Brown, Jr. et al. | |
| 2018/0368330 A1* | 12/2018 | Kurata | A01F 15/08 |
| 2019/0086239 A1 | 3/2019 | Kreisfeld et al. | |
| 2021/0251147 A1* | 8/2021 | Bonte | A01F 15/0841 |
| 2021/0259156 A1* | 8/2021 | Bonte | A01F 15/0841 |

FOREIGN PATENT DOCUMENTS

| | | |
|---|---|---|
| DE | 3535428 A1 | 4/1987 |
| DE | 3607061 A1 | 9/1987 |
| DE | 10 2009 012 240 A1 | 9/2010 |
| EP | 3 005 854 A1 | 4/2016 |
| EP | 2 736 317 B1 | 10/2016 |
| EP | 3 440 925 A1 | 2/2019 |
| SU | 1638096 A1 | 3/1991 |
| WO | 2010112373 A1 | 10/2010 |
| WO | 2019030704 A1 | 2/2019 |

* cited by examiner

ROUND BALER

TECHNICAL FIELD

This invention relates to a round baler connectable to a tractor for providing round bales and to a method for providing round bales.

BACKGROUND ART

Round balers commonly include a drive shaft, connectable to the tractor and configured to receive mechanical power from the tractor, and a transmission system, for receiving mechanical power from the drive shaft and for imparting a rotating movement to crops received in a baling chamber. Examples of such balers are provided in patent documents WO2019030704A1, EP3440925A1, EP2736317B1, EP3005854A1 in the name of the patentee. When the baler works in anomalous working conditions, for instance, because of supercharging of crops, the drive shaft may suddenly block the operation of the baler (e.g. by means of a cardan friction); then, the user needs to remove the crops in excess to reactivate the drive shaft; this reactivation requires time and may lead to serious inconveniences in the baling operation. Also, the baler usually unexpectedly interrupts its functioning when a component is damaged or worn, with the consequence that the user (namely, the farmer) has to leave his work in standby until the component is repaired or substituted. This may cause the crops in the field get wet, or rot, waiting for the reactivation of the baler.

Document U.S. Pat. No. 6,370,852 B1 discloses a baler including a plurality of sensors, among which a sensor which measures the rotational speed of the power-take off shaft. The power-take off shaft empowers the transmission system, but is not part of the transmission system.

Document DE3607061A1 discloses a baler comprising no sensors.

Document CN204389493U regards an oil circuit detection system for gearbox; no balers or agricultural machines are mentioned by CN204389493U.

Document DE3535428A1 regards an agricultural harvesting machine and generally discloses temperature sensors associated with bearings.

DISCLOSURE OF THE INVENTION

Scope of the present invention is to provide a baler and a method for providing bales which overcomes at least one of the aforementioned drawbacks.

This scope is achieved by the baler and by the method according to the appended claims.

The present disclosure regards a round baler for providing round bales. However, it is here observed that it may be applied, mutatis mutandis, to other agricultural machines, such as square balers, forage wagons or trailers. Preferably, the round baler (in the following: the baler) is connectable to a tractor. In particular, the baler includes a drawbar (tongue) connectable to a tractor for allowing the tractor towing the baler though the field. Preferably, the baler includes a drive shaft connectable to the tractor and configured to receive mechanical power from the tractor. Hence, preferably, the baler is connected to the tractor through the drawbar, to receive towing, and through the drive shaft, to receive mechanical power.

However, in one or more embodiments of the present disclosure, the baler may be an autonomous driving vehicle, provided with its own motorization unit, its own steering system and its own on-board power source. In particular, the baler may include a control unit configured for generating control signals for controlling the motorization unit and to the steering system; the control unit may in turn receive command signals through a wireless connection and derive the control signals from the command signals.

The baler comprises a baling chamber, configured for receiving crops and forming a bale. The baler comprises a frame, at least partially delimiting the baling chamber. The baler comprises a transmission system, configured for receiving mechanical power from the drive shaft and for imparting a rotating movement to the crops in the baling chamber. The transmission system includes a (or at least one) drive roller connected to the frame. Preferably, the transmission system includes a plurality of drive rollers. The transmission system includes a chain assembly. The chain assembly is connected to the drive roller. In particular, the chain assembly is interconnected between the drive shaft and the drive roller (or the plurality of drive rollers). The chain assembly receives mechanical power (in particular, mechanical motion) from the drive shaft and transfers said mechanical power to the drive roller (or the plurality of drive rollers). The transmission system includes an oil circuit, containing lubricant oil for the chain assembly. In particular, the oil circuit includes an oil tank and one or more oil pipes.

The baler comprises a control unit. The baler comprises a (or, at least one) sensor. Preferably, the baler comprises a plurality of sensors. The sensor (or the plurality of sensors) is associated with the transmission system for detecting a diagnostic parameter representative of a working condition of the transmission system. The control unit is connected to the sensor to receive the diagnostic parameter. The control unit is programmed for processing the diagnostic parameter to generate a feedback signal for a user of the round baler. For example, the baler may comprise a display connected to the control unit, and configured to make the feedback signal available to the user.

The working condition may be representative, for instance, of anomalous operating conditions (such as, for example, supercharging of the crops) or of anomalous status of one or more components of the baler during operation (for example, due to wear). The control unit may be programmed to provide, through the feedback signal, an indication relative to a maintenance requirement of the transmission system. For instance, the feedback signal may include a number of bales which may still be formed before maintenance. Generally speaking, the feedback signal may be configured to predict damages or failures, in order to allow the user to perform predictive maintenance.

Also, the feedback signal may include a warning (or an alert) that an immediate substitution or repairing of components is required, in order to prevent serious damages of the selfsame components. The control unit may be configured to inhibit the transmission system from transmitting the mechanical motion, as a function of the diagnostic parameter.

Preferably, the sensor detects the diagnostic parameter in real time. Hence, the control unit receives in real time the diagnostic parameter, to generate the feedback signal as a function of the actual working condition of the transmission system. Hence, the control unit is configured to monitor the value of the diagnostic parameter over time.

According to one or more embodiments the present disclosure, the control unit has access to a memory containing a threshold value for said diagnostic parameter. The control unit may be programmed for generating the feedback signal responsive to a comparison between the value of the diagnostic parameter and the threshold value stored in the memory. In particular, the control unit may be programmed for generating the feedback signal responsive to the diagnostic parameter exceeding (or decreasing below) the threshold value.

In an embodiment, the baler comprises an additional sensor, coupled to the transmission system and configured to detect an additional diagnostic parameter. Also the additional diagnostic parameter is representative of a working condition of the transmission system. The control unit may be programmed for receiving the diagnostic parameter and processing the additional diagnostic parameter. The control unit may be programmed for generating the feedback signal responsive to both the diagnostic parameter and the additional diagnostic parameter. In particular, the control unit may be programmed to carry out in real time a comparison (e.g. a difference) between values of the diagnostic parameter and of the additional diagnostic parameter, and to generate the feedback signal responsive to said comparison. Preferably, the diagnostic parameter and the additional diagnostic parameter are representative of a same physical entity, detected at two different locations of the baler.

According to one or more embodiments of the present disclosure, the control unit is programmed to store in a memory, for each of a plurality of successive time instants, a corresponding plurality of values for the diagnostic parameter, detected by the sensor at the plurality of successive time instants. In particular, the control unit is configured to memorize a historical trend of the values taken by the diagnostic parameter. The control unit is programmed to process the plurality of values, for generating the feedback signal responsive to a comparison of the value detected at the latest time instant with the other values of the plurality of values (e.g. with a mean value thereof).

In an embodiment, the control unit includes an artificial intelligence tool, configured for deriving, from the plurality of values stored in the memory, a reference value and a confidence interval, wherein the comparison of the value detected at the latest time instant with the other values of the plurality of values is carried out as a function of the reference value and of the confidence interval. In particular, in case the value of the diagnostic parameter detected (in real time) is far away from the reference value (in particular, falls outside the confidence interval for said reference value), a problem of wear of components and/or supercharging of crops may have being incurring.

In an embodiment wherein the baler includes the additional sensor for detecting the additional diagnostic parameter, the control unit may be programmed to store in the memory, for each of the plurality of successive time instants, also a corresponding plurality of values for the additional diagnostic parameter, and may be programmed to generate the feedback signal by comparing the values of the diagnostic parameter and of the additional diagnostic parameter at the latest time instant (or a function, e.g. a difference, thereof), with the other values of the diagnostic parameter and of the additional diagnostic parameter (or a function, e.g. a mean difference, thereof). The control unit may be configured to derive, through the artificial intelligence tool, a reference value and a confidence interval for a function (e.g. difference) of the diagnostic parameter and additional diagnostic parameter.

The transmission system includes a (at least one) bearing; the drive roller is rotatably connected to the frame through the bearing. In one or more embodiments, the sensor is associated with the bearing. In particular, the sensor is located at the bearing. Hence, one ore more bearings may be sensorized.

In an embodiment, the sensor may be configured to detect a temperature of the bearing; in this embodiment, the diagnostic parameter is representative of the temperature of the bearing. In fact, in case a supercharge of the crops occurs, and/or in case the bearing is not correctly lubricated, the temperature of the bearing increases: hence, by monitoring the temperature, it is possible to promptly detect if the crops are supercharged, and/or if the bearing is not correctly lubricated.

In an embodiment, the sensor may be configured to detect a rotational speed of the bearing; in this embodiment, the diagnostic parameter is representative of the rotational speed of the drive roller (associated with the bearing). In fact, in case supercharge of the crops occurs, the rotational speed of the bearing decreases; furthermore, by monitoring the rotational speed of a first bearing and of a second bearing (namely, by monitoring a diagnostic parameter indicative of the rotational speed of the first bearing and an additional diagnostic parameter indicative of the rotational speed of the second bearing) it is possible to detect if an undesired slipping between the first and the second bearing occurs.

In an embodiment, the sensor is associated with the chain assembly; the chain assembly includes a (at least one) chain; the diagnostic parameter is representative of an elongation of the chain. In particular, the chain assembly may include a tensioner configured to tension the chain; the sensor is configured to detect an oscillation angle of the tensioner. In this embodiment, the control unit may be programmed to calculate the elongation of the chain as a function of the oscillation angle and/or the control unit may be programmed to compare the detected oscillation angle with a threshold value (or reference value) for said oscillation angle. In fact, when the chain elongates as a consequence to wear, the oscillation angle of the tensioner increases. If the user is warned by the feedback signal that the chain has elongated, he can adjust the tensioning by regulating the tensioner, or replacing the chain. This will increase the life of components (in particular, of the chain assembly and of the bearings of the drive rollers).

In an embodiment, the sensor is associated with the oil circuit (for example, with the oil tank or the one or more oil pipes); in this embodiment, the diagnostic parameter is representative of a quality or a quantity (namely, a level) of the lubricant oil in the oil circuit. In an embodiment, the oil sensor is a viscosimeter, configured to detect a viscosity of the lubricant oil; in this embodiment, the control unit may be programmed to derive the quantity of the lubricant oil in the oil circuit as a function of the detected viscosity, and/or the control unit may be programmed to compare the detected viscosity with a threshold value (or reference value) for said viscosity.

It is here observed that, preferably, the baler comprises a plurality of sensors, configured to detect respective diagnostic parameters; the plurality of sensors includes one or more of the following sensors:
 a temperature sensor coupled to a bearing to detect the temperature of the bearing; the temperature sensor is configured to detect a temperature diagnostic parameter;
 a rotational speed sensor coupled to a bearing to detect the rotational speed of the bearing; the rotational speed sensor is configured to detect a rotational speed diagnostic parameter;

an oscillation angle sensor, coupled to the tensioner of the chain assembly to detect the oscillation angle of the tensioner; the oscillation angle sensor is configured to detect an elongation chain diagnostic parameter;

an oil sensor, coupled to the oil circuit to detect the viscosity and/or the level of the oil; the oil sensor is configured to detect an oil diagnostic parameter.

The control unit may be programmed to process each of the temperature diagnostic parameter, the rotational speed diagnostic parameter, the elongation chain diagnostic parameter and the oil diagnostic parameter according to one or more of the aspects of the present disclosure.

Preferably, (at least some of) the above mentioned sensors (temperature sensor coupled to the bearing, rotational speed sensor coupled to the bearing, oscillation angle sensor, oil sensor) are provided in combination and the control unit is programmed for processing the diagnostic parameters detected by (at least some of) the above mentioned sensors in combination. In fact, for example, in case the length of the chain increases due to wear, both the oscillation angle of the respective tensioner increases and, also, the bearings are more stressed and, consequently, their temperature increases. Also, in case the level of the oil is low, the chain incurs more wear.

The baler of the present disclosure may be of "fixed chamber" type; that is, the size (volume) of the baling chamber does not vary its size during the formation of the bale. In this case, the baler includes a plurality of rollers delimiting the baling chamber. The plurality of rollers includes said one or more drive roller. Preferably, all the rollers of the plurality of rollers delimiting the baling chamber are drive rollers, namely they are rotated by the chain assembly to form the bale.

The baler of the present disclosure may be of "variable chamber" type; that is, the volume of the baling chamber does vary its size during the formation of the bale. In this case, the baler includes a belt (or a plurality of belts) delimiting the baling chamber. In this case, the belt is mounted (wrapped) on said one or more drive rollers. The rollers are both rotated and moved at different locations to form the bale. In particular, the rollers are moved so that the baling chamber delimited by the belt may have different dimensions during the formation of the bale; in detail, the size (volume) of the baling chamber may increase while increasing the dimension of the bale which is being formed.

Furthermore, the baler of the present disclosure may be of "stop-and-go" type; that is, it is configured to produce a bale over a cycle including a first step of picking up crops from the field, feeding them to the baling chamber and rotating them in the baling chamber to form a bale (wherein the baling chamber may have either a fixed or a variable size), and a second step, of binding the formed bale with a fastening element (e.g. a net), wherein during the first step the baler moves forward in the field, while during the second step the baler stops for a certain period of time, until the bale is bound and is therefore discharged from the baler.

Alternatively, the baler of the present disclosure may be of "continuous" or "non-stop" type; that is, the baler includes a first baling chamber and a second baling chamber, wherein while a bale is being formed in the first baling chamber, another bale already formed is bound with the fastening element in the second baling chamber. In particular, the bale starts forming in the first baling chamber and, when it has reached a certain dimension, it is transferred to the second baling chamber, wherein it completes its formation and is bound with the fastening element, while another bale starts forming in the first baling chamber. The continuous baling chamber may be of fixed type (namely, the first and second baling chamber are delimited by a plurality of rollers having a fixed position, so that the size of the first and second baling chamber does not change during the formation of the bale) or variable type (namely, the first and second baling chamber are delimited by one or more belt movable with respect to the frame, so that the size of the first and second baling chamber does change during the formation of the bale).

The present disclosure also regards a method for providing round bales in a baler; preferably, the baler is connected to a tractor.

The method comprises a step of receiving crops in a baling chamber. The method comprises a step of forming a bale by rotating the crops received in the baling chamber. The crops are rotated by a transmission system which receives mechanical power from a drive shaft connected to the tractor. The transmission system is according to one or more of the aspects of the present disclosure. In particular, the transmission system includes a drive roller connected to a frame, a chain assembly connected to the drive roller, and an oil circuit, containing lubricant oil for the chain assembly.

The method comprises a step of detecting a (at least one) diagnostic parameter representative of a working condition of the transmission system, through a (at least one) sensor associated with the transmission system.

The method comprises a step of processing the diagnostic parameter in a control unit, to generate a feedback signal for a user of the round baler.

In particular, in an embodiment, the control unit generates the feedback signal responsive to a comparison between the value of the diagnostic parameter and the threshold value stored in the memory.

In an embodiment, the method comprises a step of storing in the memory (or in another memory) for each of a plurality of successive time instants, a corresponding plurality of values for the diagnostic parameter, detected by the sensor at the plurality of successive time instants; then, the control unit processes the plurality of values and generates the feedback signal responsive to a comparison of the value detected at the latest time instant with the other values of the plurality of values.

In an embodiment, the method comprises a step of deriving from the plurality of values stored in the memory, a reference value and a confidence interval through an artificial intelligence tool. Then, the comparison of the value detected at the latest time instant with the other values of the plurality of values is carried out as a function of the reference value and of the confidence interval.

In an embodiment, the method comprises a step of detecting an additional diagnostic parameter through an additional sensor, coupled to the transmission system. In this embodiment, the control unit generates the feedback signal responsive to both the diagnostic parameter and the additional diagnostic parameter. In particular, the control unit is carries out in real time a comparison between values of the diagnostic parameter and of the additional diagnostic parameter, and generates the feedback signal responsive to said comparison; preferably, the diagnostic parameter and the additional diagnostic parameter are representative of a same physical entity, detected at two different locations of the baler.

The diagnostic parameter may be representative of one or more of the following parameters:
- a temperature of a bearing associated to the drive roller;
- a rotational speed of the bearing;
- an elongation of a chain of the chain assembly;
- a quality or a quantity of the lubricant oil in the oil circuit.

BRIEF DESCRIPTION OF DRAWINGS

This and other features of the invention will become more apparent from the following detailed description of a preferred, non-limiting example embodiment of it, with reference to the accompanying drawings, in which.

DETAILED DESCRIPTION OF PREFERRED EMBODIMENTS OF THE INVENTION

With reference to the accompanying drawings, the numeral 1 denotes a baler for forming round bales. The baler 1 is connectable to a tractor. The tractor includes a motor.

In particular, the baler 1 comprises a drive shaft 31 and a drawbar 3, both connectable to the tractor. The drawbar 3 is configured to allow the tractor to tow the baler 1. The drive shaft 31, in an embodiment, is a cardan shaft. The drive shaft 31 is configured to transmit mechanical power (in particular, mechanical rotation) from a motor of the tractor to the baler 1.

The baler comprises at least a baling chamber 11, for receiving crops and forming a bale. In an embodiment, the baler 1 (in particular, the baling chamber 11) comprises a first baling chamber 11A and a second baling chamber 11B. The first baling chamber 11A is configured for starting the formation of the bale, the second baling chamber 11B is configured for completing the formation of the bale. In an embodiment, the baler comprises a transfer mechanism, for transferring the partially formed bale from the first baling chamber 11A to the second baling chamber 11B.

The baler 1 comprises a pick-up device 13, configured for picking-up crops from a field F; the pick-up device includes a pick-up roll.

The baler 1 comprises a feeding system 12 configured for feeding the crops to the baling chamber 11. In an embodiment, the feeding system 12 has a first configuration, for feeding the crops to the first baling chamber 11A, and a second configuration, for feeding the crops to the second baling chamber 11B. The feeding system 12 includes a feeding channel, having an inlet for receiving the crops from the pick-up device and an outlet opened to the baling chamber 11, to feed the crops to the baling chamber 11. The feeding system 12 includes a feeding rotor, configured to advance the crops along the feeding channel. The feeding system 12 includes a drop floor device, defining a (portion of) bottom side of the feeding channel. The drop floor device is positioned between the inlet and the outlet of the feeding channel. The feeding rotor is positioned above said drop floor device.

The baler 1 comprises a wheel axle 9. The baler 1 comprises a plurality of wheels rotatable about the wheel axle 9 and operatively resting on the field F. The wheel axle 9 is perpendicular with respect to an advancement direction of the tractor (and of the baler 1). The baler 1 comprises a frame 14. The frame 14 is supported on the wheel axle 9. The frame 14 includes a first and a second side walls. The first and second side walls are oriented perpendicularly with respect to the wheel axle 9.

The baler 1 comprises a binding unit 10. The binding unit 10 includes a reservoir of the fastening element and is configured to bind the bale with a fastening element. The binding unit 10 may be contained in the frame 14, to bind the bale while the bale is still housed in the baling chamber 11, or it may be external with respect to the frame 14, to bind the bale once released from the baling chamber 11.

The baler 1 comprises a transmission system 4. The transmission system 4 comprises a plurality of drive rollers, a chain assembly and an oil circuit. The chain assembly comprises a plurality of chains and a plurality of tensioners.

The drive rollers of said plurality are configured for imparting a rotating movement to the crops. In the embodiment wherein the baler 1 is a fixed chamber baler, the drive rollers of said plurality are configured to directly impart the rotating movement to the crops contained in the baling chamber 11. In the embodiment wherein the baler 1 is a variable chamber baler, the transmission system 4 further comprises a belt 41, and the drive rollers are configured to rotate the belt 41.

The baler 1 comprises a plurality of sensors, associated with the transmission system 4.

Figure 1:
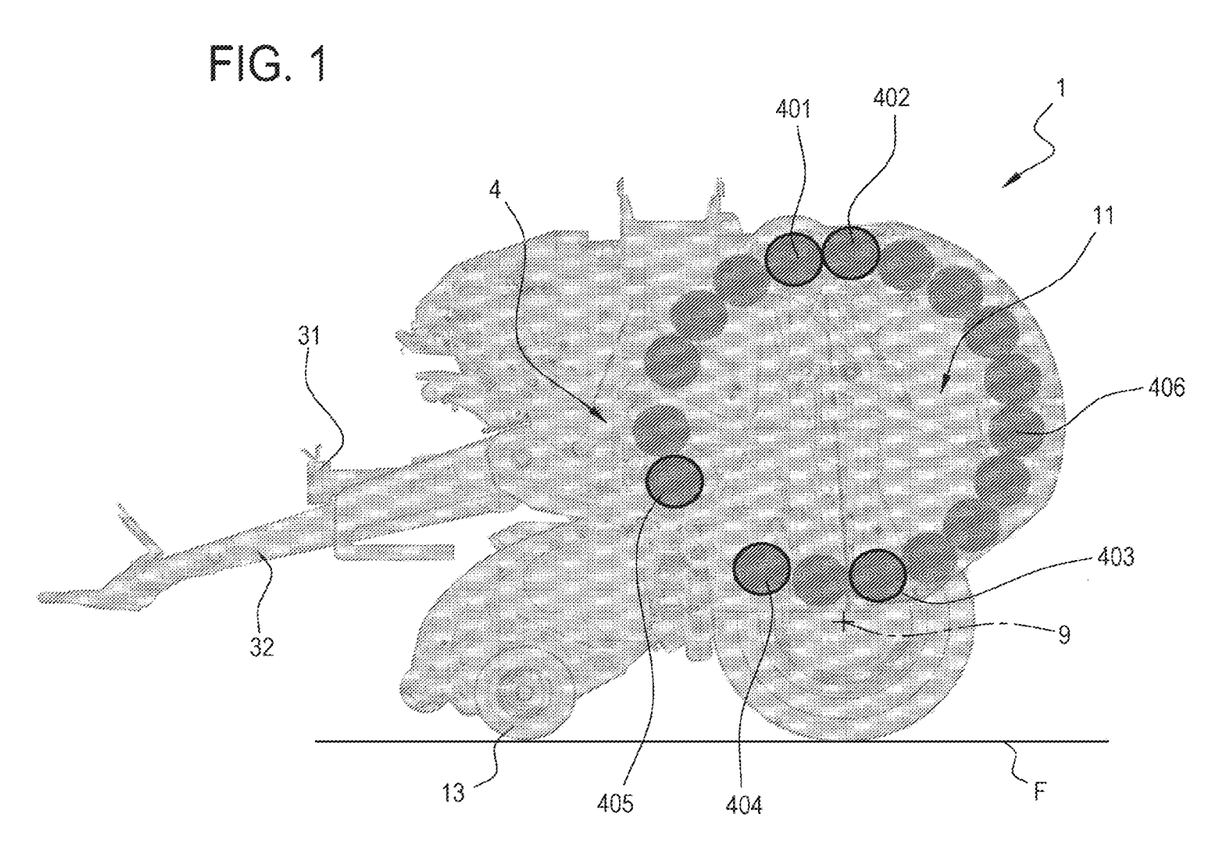
FIG. 1 illustrates a fixed chamber, "stop-and-go" baler according to an embodiment of the present disclosure, wherein a plurality of sensors located at a plurality of bearings is shown.
Figure 4A:
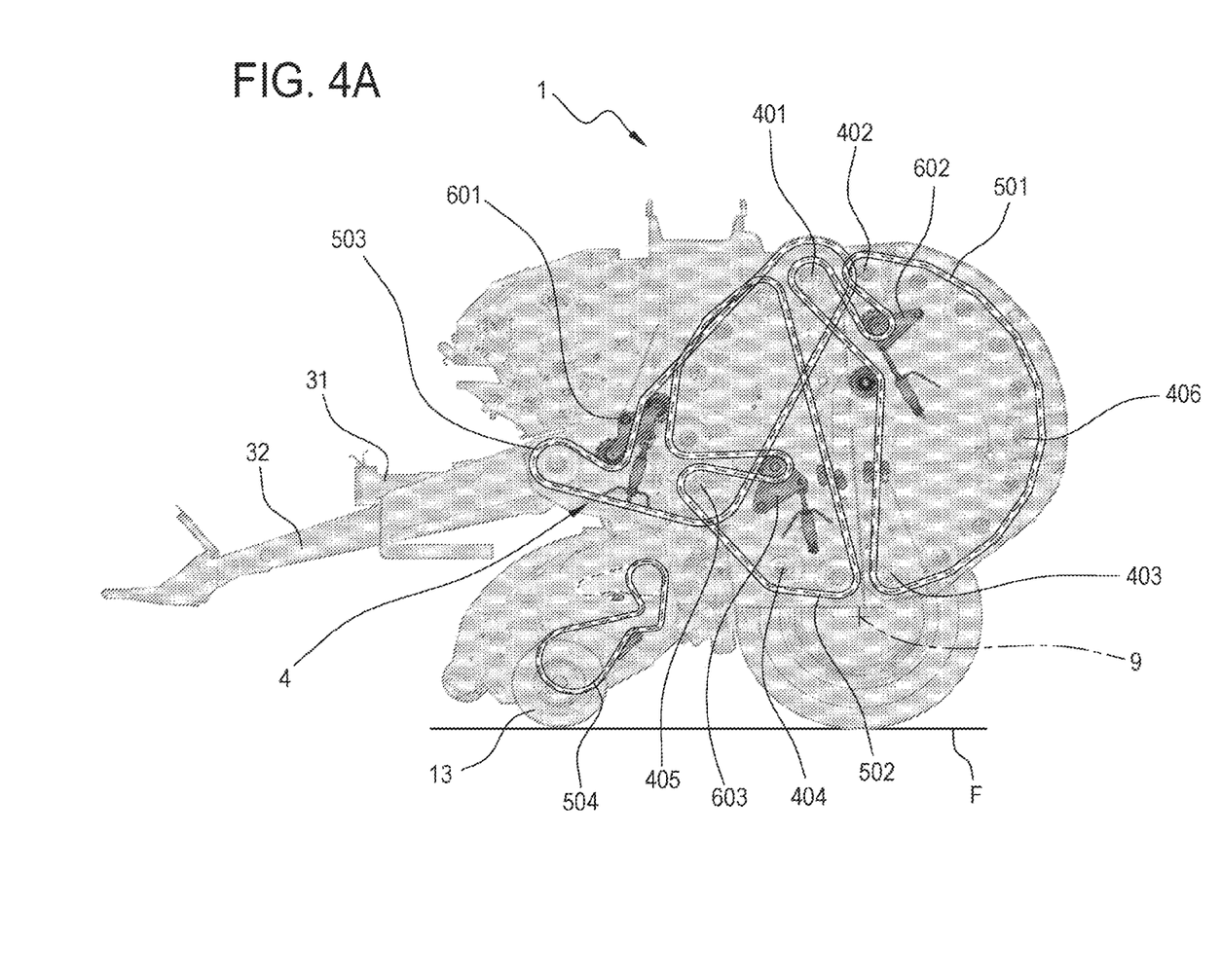
FIGS. 4A and 4B illustrate opposite sides of the fixed chamber baler of FIG. 1, wherein a plurality of sensors located at a plurality of tensioners is shown.
Figure 4B:
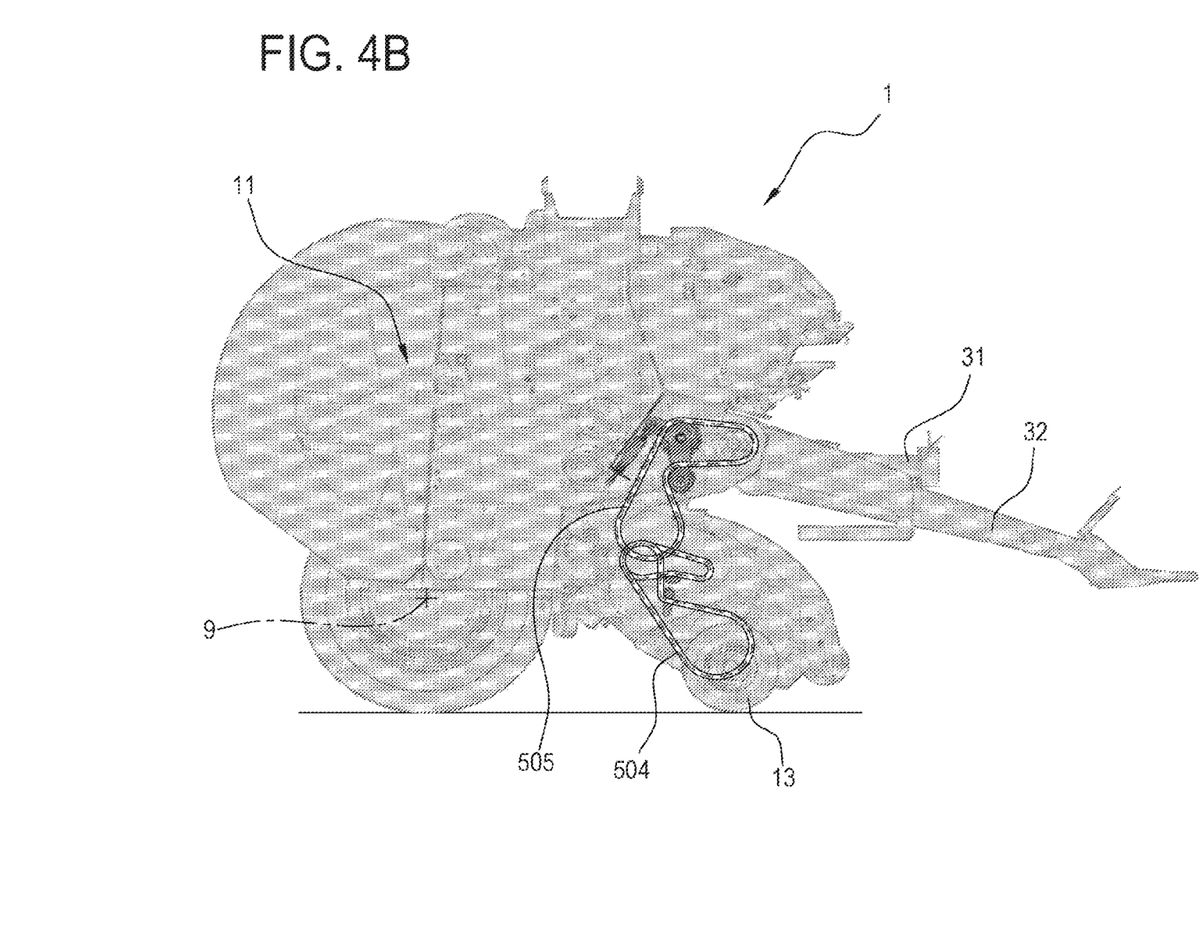

In particular, in the embodiment wherein the baler 1 is of the fixed, "stop-and-go" type, the plurality of drive rollers includes a pair of joint rollers 401, 402, a bottom roller 403, a pair of feeding rollers 404, 405, and further rollers 406. The chain assembly comprises a first chain 5011, a second chain 502, and a third chain 503, configured to rotate the plurality of drive rollers. The third chain 503 receives mechanical motion from the drive shaft 31 and transfers the mechanical motion to the first and second chains 501, 502, which in turn move the plurality of drive rollers. The joint rollers 401, 402 are provided at the junction between chains 501 and 503.

Furthermore, the baler 1 may comprise a first and a second pick-up chains 504, 505, wherein the first pick-up chain 504 receives mechanical motion from the drive shaft 31 and transfers the mechanical motion to the second pick-up chain 505, which in turns rotates the rotor of the pick-up 13.

Figure 8:
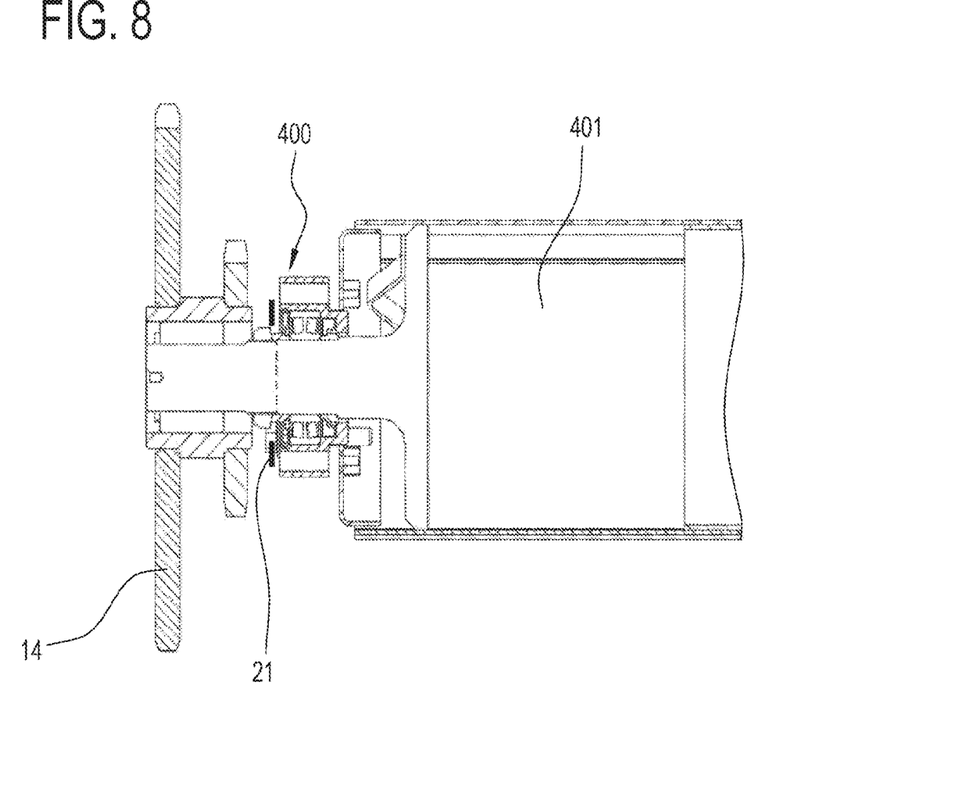
FIG. 8 illustrates a particular of a bearing provided with a temperature and/or rotational speed sensor in any of the balers of FIGS. 1, 2, 3.

Temperature/and or rotational speed sensors 21 are preferably associated with one or more of said joint rollers 401, 402, bottom roller 403, pair of feeding rollers 404, 405. In particular, said joint rollers 401, 402, bottom roller 403, pair of feeding rollers 404, 405 are rotatably connected to the frame 14 through respective bearings 400, and the sensors 21 are coupled to the bearings 400. In other words, one or more of said joint rollers 401, 402, bottom roller 403, pair of feeding rollers 404, 405 include sensorized bearings. In fact, joint rollers 401, 402 are critical because they are provided at the junction between chains 501 and 502. Bottom roller 403 is critical because it receives the weight of the bale contained in the baling chamber 11. Feeding rollers 404, 405 are critical because, being provided at the outlet of the feeding channel, they start rotating the crops.

Figure 6:
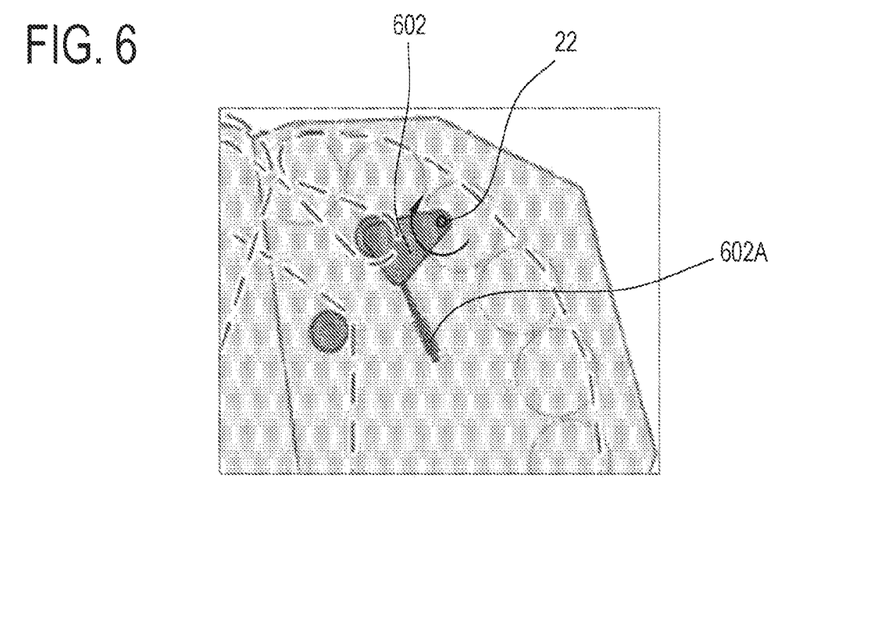
FIG. 6 illustrates a particular of a chain tensioner provided with an oscillation angle sensor.

Chains 501, 502, 503 are tensioned by tensioners 601, 602, 603, respectively. Oscillation angle sensors 22 are provided at one or more of said tensioners 601, 602, 603, to detect an oscillation angle of said tensioners 601, 602, 603. In particular, each tensioner 601, 602, 603 includes a hinge and a spring 602A connected to the frame 14; the tensioner is configured to oscillate about the hinge; the chain makes the tensioner oscillate, against the force of the spring 602A.

The baler 1 further comprises an oil circuit containing oil to lubricate the chains 501, 502, 503, 504, 505. An oil sensor 23 is provided at the oil circuit to detect a property of the oil (e.g. the viscosity).

Figure 2:
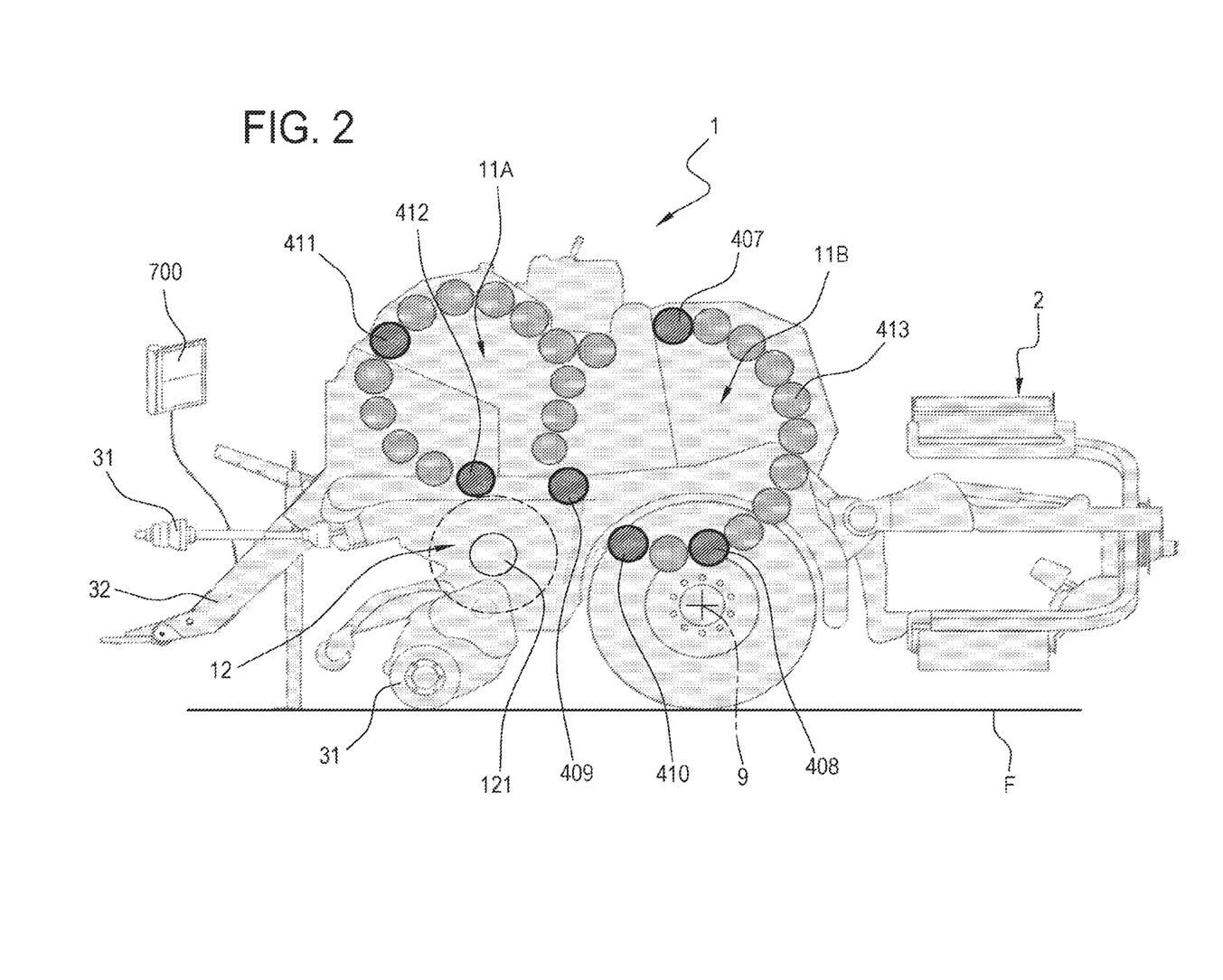
FIG. 2 illustrates a fixed chamber, "non-stop" baler, according to an embodiment of the present disclosure, wherein a plurality of sensors located at a plurality of bearings is shown.
Figure 5:
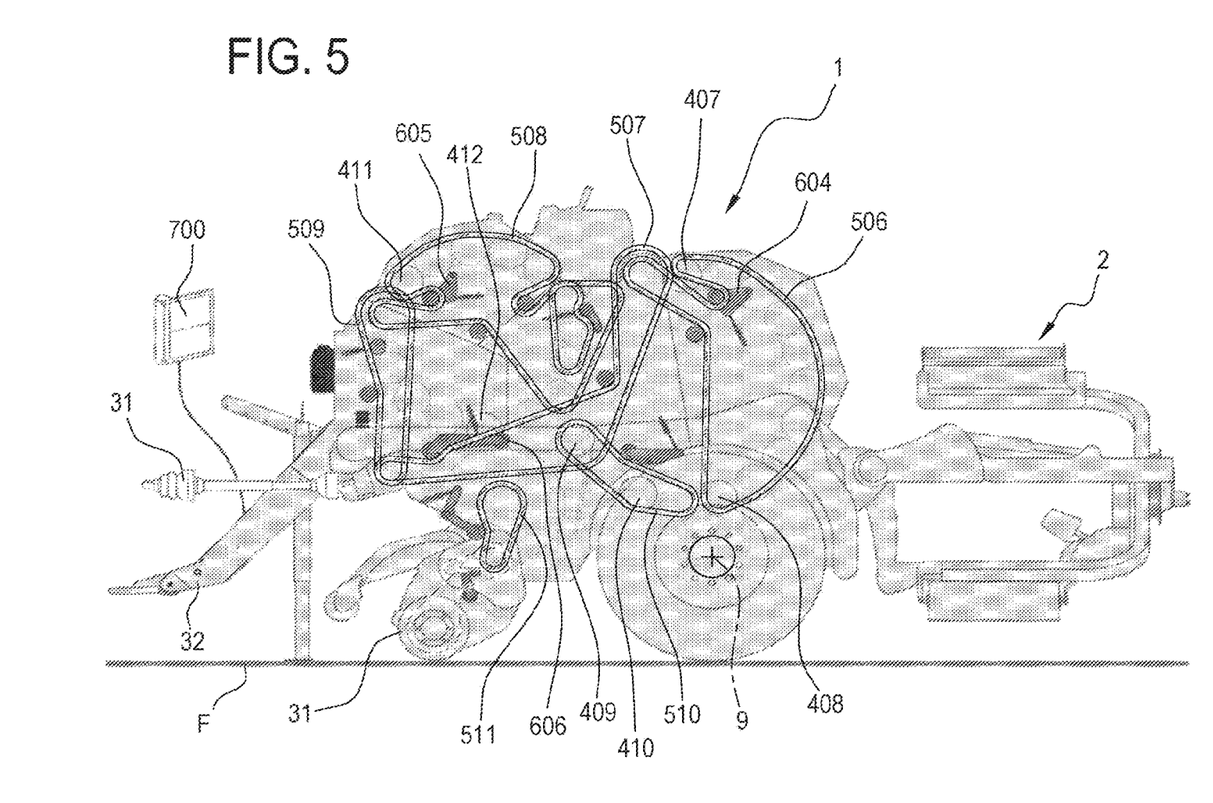
FIG. 5 illustrates the non-stop baler of FIG. 2, wherein a plurality of sensors located at a plurality of tensioners is shown.

In the embodiment wherein the baler 1 is of the fixed, "non-stop" type, the plurality of drive rollers includes a first joint roller 411 and a second joint roller 407, a first bottom roller 412 and a second bottom roller 408, a pair of feeding rollers 409, 410, and further rollers 413. Preferably, the first joint roller 411 is provided at the first baling chamber 11A and the second joint roller 407 is provided at the second baling chamber 11B, also, the first bottom roller 412 is provided at the first baling chamber 11A and the second bottom roller 408 is provided at the second baling chamber 11B. The chain assembly comprises a first chain 506, a second chain 507, a third chain 508, a fourth chain 509, and a fifth chain 510 configured to rotate the plurality of drive rollers. The chain 509 receives mechanical motion from the drive shaft 31 and transfers the mechanical motion to the other chains 506, 507, 508, 510, which in turn move the plurality of drive rollers.

Furthermore, the baler may comprise a pick-up chain 511, which receives mechanical motion from the drive shaft 31 and transfers the mechanical motion to the rotor of the pick-up 13.

Temperature/and or rotational speed sensors 21 are preferably associated with one or more of said first joint roller 411, second joint roller 407, first bottom roller 412, second bottom roller 408, pair of feeding rollers 409, 410. In particular, said first joint roller 411, second joint roller 407, first bottom roller 412, second bottom roller 408, pair of feeding rollers 409, 410 are rotatably connected to the frame 14 through respective bearings 400, and the sensors 21 are coupled to the bearings 400.

In other words, one or more of said first joint roller 411, second joint roller 407, first bottom roller 412, second bottom roller 408, pair of feeding rollers 409, 410 include sensorized bearings. In fact, the joint rollers 407, 411 are critical because they are provided at the junction between chains 506 and 507 and between chains 508, 509, respectively. The first bottom roller 412 is critical because it receives the weight of the partially formed bale contained in the first baling chamber 11A; moreover, the first bottom roller 412 starts rotating the crops in the first baling chamber 11A. The second bottom roller 408 is critical because it receives the weight of the bale contained in the second baling chamber 11B. The feeding rollers 409, 410 are critical because they start rotating the bale in the second baling chamber 11B.

Chains 506, 507, 508 are tensioned by tensioners 604, 606, 605, respectively. Oscillation angle sensors 22 are provided at one or more of said tensioners 604, 606, 605, to detect an oscillation angle of said tensioners 604, 606, 605. In particular, each tensioner 604, 606, 605 includes a hinge and a spring connected to the frame 14; the tensioner is configured to oscillate about the hinge; the chain makes the tensioner oscillate, against the force of the spring.

The baler 1 further comprises an oil circuit containing oil to lubricate the chains 506, 507, 508, 509, 510, 511. An oil sensor 23 is provided at the oil circuit to detect a property of the oil (e.g. the viscosity).

Figure 3:
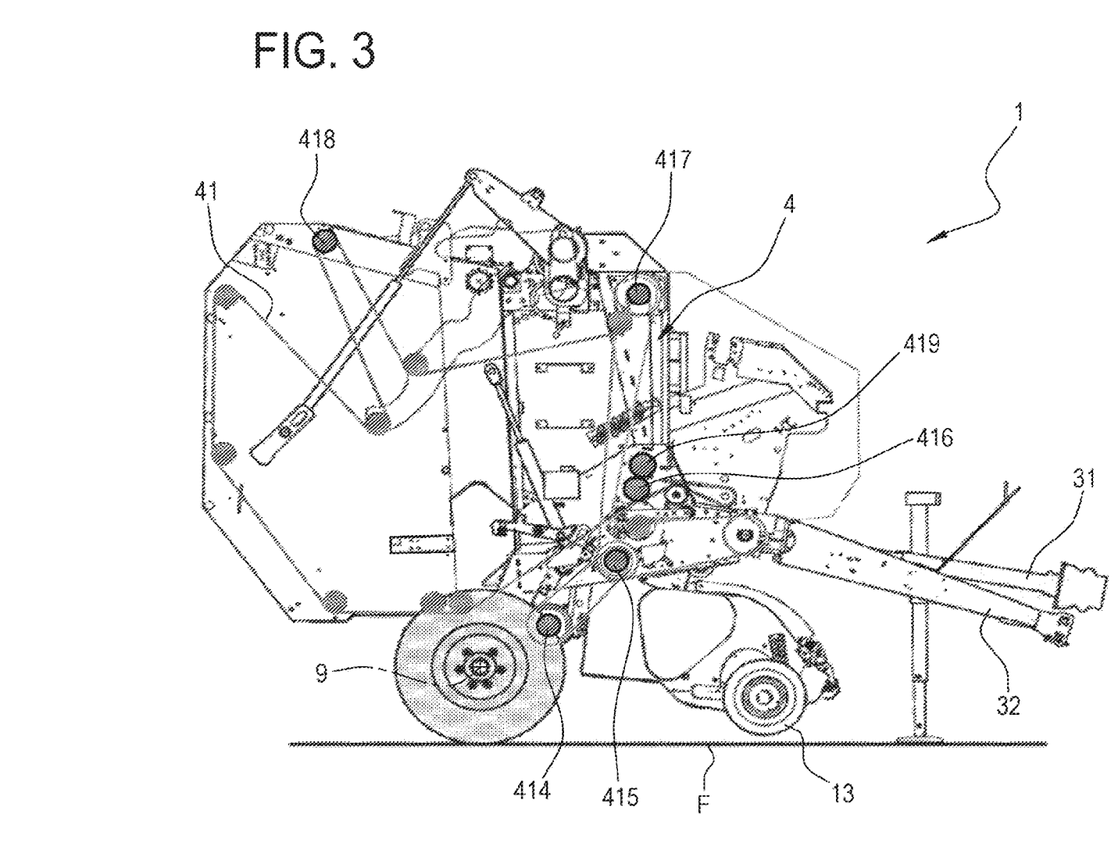
FIG. 3 illustrates a variable chamber, "stop-and-go" baler, according to an embodiment of the present disclosure, wherein a plurality of sensors located at a plurality of bearings is shown.
Figure 7:
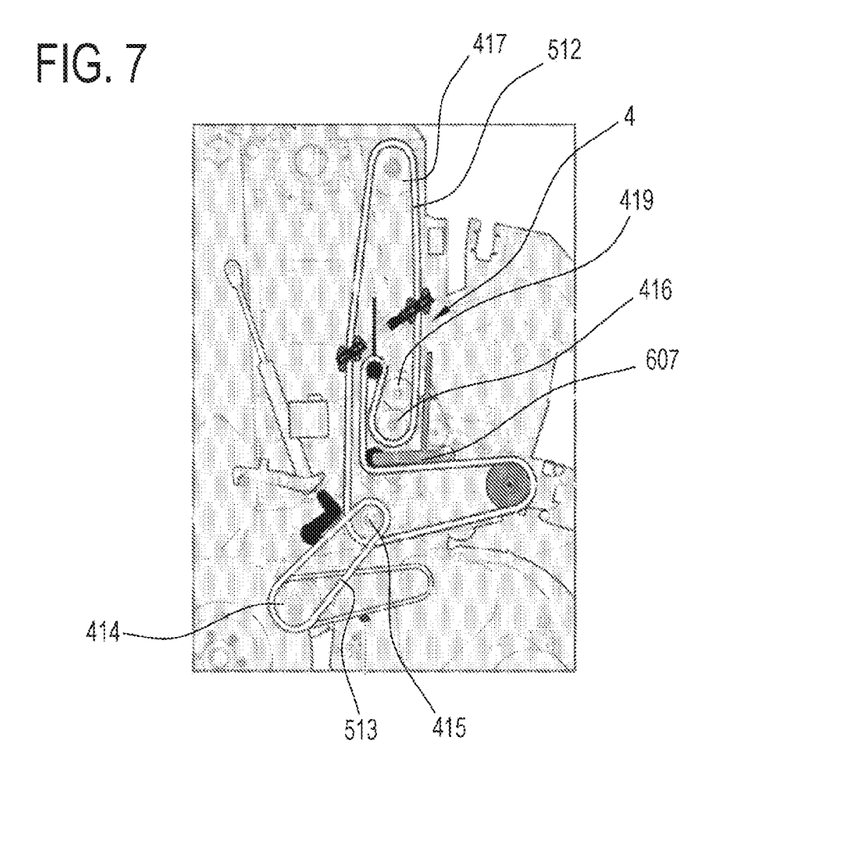
FIG. 7 illustrates a particular of the variable chamber baler of FIG. 3, wherein a plurality of sensors located at a plurality of tensioners is shown.

In the embodiment wherein the baler 1 is of the variable, "stop-and-go" type, the plurality of drive rollers includes a pair of feeding rollers 414, 415, a first and a second guide rollers 416, 417 (configured to guide the belt 41), and further rollers 419. The chain assembly comprises a chain 512, which receives mechanical motion from the drive shaft 31 and moves the drive rollers; preferably, the baler 1 also comprises a pick-up chain 513, which receives mechanical motion from the drive shaft 31 and moves the rotor of the pick-up 13. Preferably, the first and second guide rollers 416, 417 are connected to the chain 512 and transmit mechanical motion to the belt 41. The transmission system further includes at least a dragged roller 418, which is moved by the belt 31.

Temperature/and or rotational speed bearings sensors 21 sensors are preferably associated with one or more of said feeding rollers 414, 415, first, second and third guide rollers 416, 417. In particular, said feeding rollers 414, 415, first, second and third guide rollers 416, 417 are rotatably connected to the frame 14 through respective bearings 400, and the sensors 21 are coupled to the bearings 400. In other words, one or more of said feeding rollers 414, 415, first, second and third guide rollers 416, 417 include sensorized rollers bearings. In fact, feeding rollers 414, 415 are critical because, being provided at the outlet of the feeding channel, they start rotating the crops. The first and second guide rollers 416, 417 are critical because they move the belt 41. Furthermore, an additional sensor 201 may be provided at the dragged roller 418 (in particular, at a bearing of the dragged roller). Preferably, an additional sensor 210 is a rotational speed sensor. In case the rotational speed of the dragged roller 418 differs from the rotational speed of the first and/or second guide roller 416, 417, the belt 41 is slipping and the baler 1 may incur blocking.

Chain 512 is tensioned by a tensioner 607. An oscillation angle chain sensor 22 is provided at said tensioner 607, to detect an oscillation angle of said tensioner 607. In particular, the tensioner 607 includes a hinge and a spring connected to the frame 14; the tensioner is configured to oscillate about the hinge; the chain makes the tensioner oscillate, against the force of the spring. The baler 1 further comprises an oil circuit containing oil to lubricate the chains 512, 513. An oil sensor 23 is provided at the oil circuit to detect a property of the oil (e.g. the viscosity).

Figure 9:
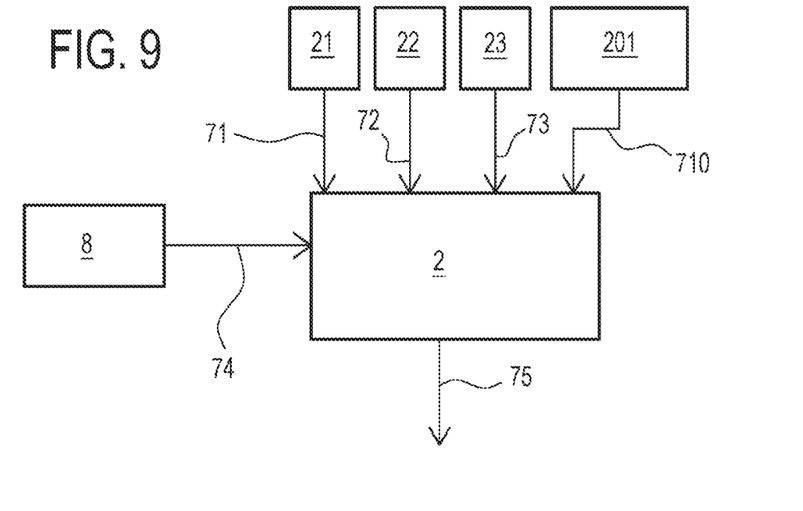
FIG. 9 schematically illustrates detecting a diagnostic parameter and processing the diagnostic parameter, according to the present disclosure.

The baler 1 comprises a control unit 2. The control unit 2 is connected to the bearings sensors 21 to receive a diagnostic parameter 71 representative of the temperature and/or rotational speed of the bearings 400 (and, consequently, of the drive rollers associated with the bearings 400). The control unit 2 is connected to the chain sensors 22 to receive a diagnostic parameter 72 representative of the oscillation angle of the tensioner (and, consequently, of the elongation of chain). The control unit 2 is connected to the oil sensor 23 to receive a diagnostic parameter 73 representative of the quality and/or quantity of the oil (in particular, of its viscosity). The control unit 2 is connected to the additional sensor 210 to receive an additional diagnostic parameter 710 representative of the rotational speed of the bearing associated with the dragged roller 418 (and, consequently, of the rotational speed of the dragged roller 418 itself). The control unit 2 is programmed for processing the diagnostic parameters 71, 72, 73 to generate a feedback signal 75 for a user of the baler 1. The baler 1 comprises a display 700 (which may be remotely connected to the control unit 2, for instance it may be mounted on the tractor), for making the feedback signal 75 available to the user.

In an embodiment, the control unit 2 has access to a memory 8 containing threshold values 74 for said diagnostic parameters 71, 72, 73 and is programmed for generating the feedback signal 75 responsive to a comparison between the value of the diagnostic parameters 71, 72, 73 and the respective threshold values 74.

In an embodiment, the control unit 2 is programmed for carry out a comparison (in particular, a difference) between the additional diagnostic parameter 710 representative of the rotational speed of the dragged roller 418 with the diagnostic parameter 71 representative of the rotational speed of the bearing 400 of the drive roller (or of the plurality of driven rollers) and to derive the feedback signal 75 as a function of said comparison.

The following paragraphs, listed below with alphanumeric reference, represent non-limiting and exemplifying manners for describing the present disclosure.

A. An agricultural machine comprising:
a frame 14;
a drive shaft 31, connectable to the tractor and configured to receive mechanical power from the tractor;
a transmission system, for receiving mechanical power from the drive shaft 31, the transmission system 4 including a drive roller 401 connected to the frame 14, a chain assembly connected to the drive roller 401, and an oil circuit, containing lubricant oil for the chain assembly;
a control unit.

A1. The agricultural machine of paragraph A, being a round baler connectable to a tractor for providing round bales, and comprising a baling chamber 11, configured for receiving crops and forming a bale, wherein the transmission system 4 is configured for imparting a rotating movement to the crops contained in the baling chamber.

A2. The agricultural machine of paragraph A or A1, comprising a sensor 21, 22, 23 associated with the transmission system 4 for detecting a diagnostic parameter 71, 72, 73 representative of a working condition of the transmission system 4, wherein the control unit 2 is connected to the sensor 21, 22, 23 to receive the diagnostic parameter 71, 72, 73 and is programmed for processing the diagnostic parameter 71, 72, 73 to generate a feedback signal 75 for a user of the agricultural machine.

A3. The agricultural machine of paragraph A or A1, comprising an additional sensor 201, coupled to the transmission system 4 and configured to detect an additional diagnostic parameter 710, wherein the control unit 2 is programmed for processing the additional diagnostic parameter 710 and for generating the feedback signal 75 responsive to both the diagnostic parameter 71, 72, 73 and the additional diagnostic parameter 710.

A3.1 The agricultural machine of paragraph A3, wherein the control unit 2 is programmed to carry out in real time a comparison between values of the diagnostic parameter 71, 72, 73 and of the additional diagnostic parameter 710, and to generate the feedback signal 75 responsive to said comparison, wherein the diagnostic parameter 71, 72, 73 and the additional diagnostic parameter 710 are representative of a same physical entity, detected at two different locations of the agricultural machine.

A4. The agricultural machine of any of the paragraphs from A to A3.1, wherein the control unit 2 is programmed to store in a memory 8, for each of a plurality of successive time instants, a corresponding plurality of values for the diagnostic parameter 71, 72, 73, detected by the sensor 21, 22, 23 at the plurality of successive time instants, and is programmed to process the plurality of values, for generating the feedback signal 75 responsive to a comparison of the value detected at the latest time instant with the other values of the plurality of values.

B. A bearing monitoring system for an agricultural machine, the system comprising:
at least one sensor 21 couplable with a bearing associated with a roller of the agricultural machine, said at least sensor being configured to detect a diagnostic parameter 71 representative of a working condition of the bearing;
a control unit 2 configured to receive the diagnostic parameter,
wherein the control unit 2 is connected to the at least one sensor 21 to receive the diagnostic parameter 71 and is programmed for processing the diagnostic parameter 71 to generate a feedback signal 75 for a user of the agricultural machine.

B1. The bearing monitoring system according to paragraph B, wherein said at least one sensor 21 includes a temperature sensor configured to detect a diagnostic parameter 71 representative of a temperature of the bearing.

B2. The bearing monitoring system according to paragraph B or B1, wherein said at least one sensor 21 includes a rotational speed sensor configured to detect a diagnostic parameter 72 representative of a rotational speed sensor of the bearing (and/or of the roller associated with the bearing).

B3. The bearing monitoring system according to paragraph B2, further comprising an additional sensor 201 couplable with an additional bearing associated with an additional roller of the agricultural machine, said additional sensor 201 being configured to detect an additional diagnostic parameter 710 representative of a rotational speed of the additional bearing, wherein the control unit 2 is programmed for processing the diagnostic parameter 71 and the additional diagnostic parameter 710, to generate the feedback signal 75 as a function of a difference between the diagnostic parameter 71 and the additional diagnostic parameter 710.

B4. An agricultural machine comprising the bearing monitoring system according to any of the paragraphs from B to B3.

B4.1. An agricultural machine according to paragraph B4, being a round baler.

C. A chain monitoring system for an agricultural machine, the system comprising:
at least one sensor 22 couplable with a chain assembly of the agricultural machine, said at least sensor 22 being configured to detect a diagnostic parameter 72 representative of a working condition of the chain assembly;
a control unit 2 configured to receive the diagnostic parameter 72,
wherein the control unit 2 is connected to the at least one sensor 22 to receive the diagnostic parameter 72 and is programmed for processing the diagnostic parameter 72 to generate a feedback signal 75 for a user of the agricultural machine.

C1. The chain monitoring system according to paragraph C, wherein the chain assembly includes at least one chain 501, wherein the diagnostic parameter 72 is representative of an elongation of the chain.

C1.1 The chain monitoring system according to paragraph C1, wherein the chain assembly includes at least one tensioner 601, configured to tension the chain 501, wherein the sensor 22 is configured to detect an oscillation angle of the tensioner 601.

C2. An agricultural machine comprising the chain monitoring system according to any of the paragraphs from C to C1.1.

C2.1. An agricultural machine according to paragraph C2, being a round baler.

D. An oil monitoring system for an agricultural machine, the system comprising:
- at least one sensor 23 couplable with an oil circuit of the agricultural machine, said at least sensor 23 being configured to detect a diagnostic parameter 73 representative of a working condition of the oil circuit;
- a control unit 2 configured to receive the diagnostic parameter 73, wherein the control unit 2 is connected to the at least one sensor 23 to receive the diagnostic parameter 73 and is programmed for processing the diagnostic parameter 73 to generate a feedback signal 75 for a user of the agricultural machine.

D1. An oil monitoring system according to paragraph D, wherein the diagnostic parameter 73 is representative of a quality or a quantity of the lubricant oil in the oil circuit.

D2. An oil monitoring system according to paragraph D or D1, wherein the at least one sensor 23 is configured to measure a viscosity of the oil contained in the oil circuit.

D3. An agricultural machine comprising the oil monitoring system according to any of the paragraphs from D to D2.

D3.1. An agricultural machine according to paragraph D3, being a round baler.

The invention claimed is:

1. A round baler connectable to a tractor for providing round bales, the baler comprising:
- a baling chamber, configured for receiving crops and forming a bale;
- a frame, at least partially delimiting the baling chamber;
- a drive shaft, connectable to the tractor and configured to receive mechanical power from the tractor;
- a transmission system, for receiving mechanical power from the drive shaft and for imparting a rotating movement to the crops contained in the baling chamber, the transmission system including a drive roller connected to the frame, a chain assembly connected to the drive roller, and an oil circuit, containing lubricant oil for the chain assembly;
- a control unit; and
- a sensor, associated with the transmission system for detecting a diagnostic parameter representative of a working condition of the transmission system, wherein the control unit is connected to the sensor to receive the diagnostic parameter and is programmed for processing the diagnostic parameter to generate a feedback signal for a user of the round baler, wherein the control unit has access to a memory containing a threshold value for said diagnostic parameter, and wherein the control unit is programmed for generating the feedback signal responsive to a comparison between the value of the diagnostic parameter and the threshold value stored in the memory, wherein the baler comprises an additional sensor, coupled to the transmission system and configured to detect an additional diagnostic parameter, wherein the control unit is programmed for processing the additional diagnostic parameter and for generating the feedback signal responsive to both the diagnostic parameter and the additional diagnostic parameter, and wherein the control unit is programmed to carry out in real time a comparison between values of the diagnostic parameter and of the additional diagnostic parameter, and to generate the feedback signal responsive to said comparison, wherein the diagnostic parameter and the additional diagnostic parameter are representative of a same physical entity, detected at two different locations of the baler.

2. The baler according to claim 1, wherein the control unit is programmed to store in a memory, for each of a plurality of successive time instants, a corresponding plurality of values for the diagnostic parameter, detected by the sensor at the plurality of successive time instants, and is programmed to process the plurality of values, for generating the feedback signal responsive to a comparison of the value detected at a latest time instant with the other values of the plurality of values.

3. The baler according to claim 2, wherein the control unit includes an artificial intelligence tool, configured for deriving, from the plurality of values stored in the memory, a reference value and a confidence interval, wherein the comparison of the value detected at the latest time instant with the other values of the plurality of values is carried out as a function of the reference value and of the confidence interval.

4. The baler according to claim 1, wherein the transmission system includes a bearing, wherein the drive roller is rotatably connected to the frame through the bearing, and wherein the sensor is associated with the bearing.

5. The baler according to claim 4, wherein the sensor is configured to detect a temperature of the bearing, whereby the diagnostic parameter is representative of the temperature of the bearing.

6. The baler according to claim 4, wherein the sensor is configured to detect a rotational speed of the bearing, whereby the diagnostic parameter is representative of the rotational speed of the drive roller.

7. The baler according to claim 1, wherein the sensor is associated with the chain assembly, which includes a chain, whereby the diagnostic parameter is representative of an elongation of the chain.

8. The baler according to claim 7, wherein the chain assembly includes a tensioner configured to tension the chain, wherein the sensor is configured to detect an oscillation angle of the tensioner, and wherein the control unit is programmed to calculate the elongation of the chain as a function of the oscillation angle.

9. The baler according to claim 7, wherein the chain assembly includes a tensioner configured to tension the chain, wherein the sensor is configured to detect the diagnostic parameter responsive to a chain tension condition.

10. The baler according to claim 1, wherein the sensor is associated with the oil circuit, whereby the diagnostic parameter is representative of a quality or a quantity of the lubricant oil in the oil circuit.

11. The baler according to claim 10, wherein the sensor is a viscosimeter, configured to detect a viscosity of the lubricant oil.

12. A method for providing round bales in a round baler connected to a tractor, comprising the following steps:
  receiving crops in a baling chamber;
  forming a bale by rotating the crops received in the baling chamber, wherein the crops are rotated by a transmission system which receives mechanical power from a drive shaft connected to the tractor, the transmission system including a drive roller connected to a frame, a chain assembly connected to the drive roller, and an oil circuit, containing lubricant oil for the chain assembly;
  detecting a diagnostic parameter representative of a working condition of the transmission system, through a sensor associated with the transmission system; and
  processing the diagnostic parameter in a control unit, to generate a feedback signal for a user of the round baler,
  wherein the control unit has access to a memory containing a threshold value for said diagnostic parameter, and wherein the control unit generates the feedback signal responsive to a comparison between the value of the diagnostic parameter and the threshold value stored in the memory,
  wherein the method includes a step of detecting an additional diagnostic parameter, wherein the control unit processes the additional diagnostic parameter and generates the feedback signal responsive to both the diagnostic parameter and the additional diagnostic parameter, and
  wherein the control unit carries out in real time a comparison between values of the diagnostic parameter and of the additional diagnostic parameter, and generates the feedback signal responsive to said comparison, wherein the diagnostic parameter and the additional diagnostic parameter are representative of a same physical entity, detected at two different locations of the baler.

13. The method according to claim 12, wherein the diagnostic parameter is representative of one or more of the following parameters:
  a temperature of a bearing associated with the drive roller;
  a rotational speed of the bearing;
  an elongation of a chain of the chain assembly;
  a quality or a quantity of the lubricant oil in the oil circuit.

14. The method according to claim 12, wherein the chain assembly includes a chain and a tensioner configured to tension the chain, wherein the sensor detects the diagnostic parameter responsive to a chain tension condition.

15. The method according to claim 12, wherein the diagnostic parameter is representative of an elongation of the chain.

16. A round baler connectable to a tractor for providing round bales, the baler comprising:
  a baling chamber, configured for receiving crops and forming a bale;
  a frame, at least partially delimiting the baling chamber;
  a drive shaft, connectable to the tractor and configured to receive mechanical power from the tractor;
  a transmission system, for receiving mechanical power from the drive shaft and for imparting a rotating movement to the crops contained in the baling chamber, the transmission system including a bearing, a drive roller rotatably connected to the frame through the bearing, a chain assembly connected to the drive roller, and an oil circuit, containing lubricant oil for the chain assembly;
  a control unit; and
  a plurality of sensors, associated with the transmission system for detecting a diagnostic parameter representative of a working condition of the transmission system, wherein the control unit is connected to a sensor of the plurality of sensors to receive the diagnostic parameter,
  wherein the plurality of sensors includes a first sensor associated with the bearing and a second sensor associated with the chain assembly to sense an elongation of the chain.

17. The round baler of claim 16, wherein the plurality of sensors includes a third sensor, associated with the oil circuit, to sense a quality or a quantity of the lubricant oil in the oil circuit.

18. A round baler connectable to a tractor for providing round bales, the baler comprising:
  a baling chamber, configured for receiving crops and forming a bale;
  a frame, at least partially delimiting the baling chamber;
  a drive shaft, connectable to the tractor and configured to receive mechanical power from the tractor;
  a transmission system, for receiving mechanical power from the drive shaft and for imparting a rotating movement to the crops contained in the baling chamber, the transmission system including a drive roller connected to the frame, a chain assembly connected to the drive roller, and an oil circuit, containing lubricant oil for the chain assembly;
  a control unit; and
  a sensor, associated with the transmission system for detecting a diagnostic parameter representative of a working condition of the transmission system, wherein the control unit is connected to the sensor to receive the diagnostic parameter and is programmed for processing the diagnostic parameter to generate a feedback signal for a user of the round baler,
  wherein the control unit is programmed to store in a memory, for each of a plurality of successive time instants, a corresponding plurality of values for the diagnostic parameter, detected by the sensor at the plurality of successive time instants, and is programmed to process the plurality of values, for generating the feedback signal responsive to a comparison of the value detected at a latest time instant with the other values of the plurality of values.

19. A method for providing round bales in a round baler connected to a tractor, comprising the following steps:
  receiving crops in a baling chamber;
  forming a bale by rotating the crops received in the baling chamber, wherein the crops are rotated by a transmission system which receives mechanical power from a drive shaft connected to the tractor, the transmission system including a drive roller connected to a frame, a chain assembly connected to the drive roller, and an oil circuit, containing lubricant oil for the chain assembly;
  detecting a diagnostic parameter representative of a working condition of the transmission system, through a sensor associated with the transmission system; and
  processing the diagnostic parameter in a control unit, to generate a feedback signal for a user of the round baler,
  wherein the control unit stores in a memory, for each of a plurality of successive time instants, a corresponding plurality of values for the diagnostic parameter, detected by the sensor at the plurality of successive time instants, and processes the plurality of values, for generating the feedback signal responsive to a comparison of the value detected at a latest time instant with the other values of the plurality of values.

\* \* \* \* \*